Figure 1:
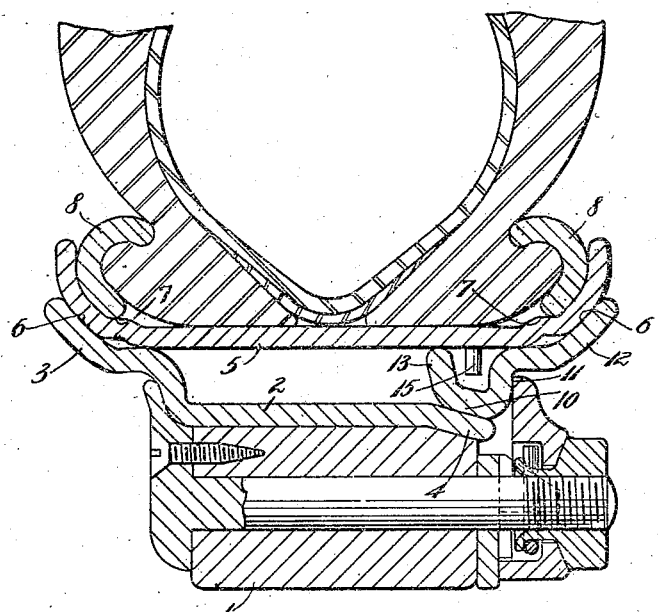

R. S. BRYANT.
RIM FOR VEHICLE WHEELS.
APPLICATION FILED SEPT. 2, 1913.

1,162,563.

Patented Nov. 30, 1915.

WITNESSES:
R. L. Bruck.
Hugh B. McGill.

INVENTOR.
Richard S. Bryant
By Hull & Smith
ATTY'S.

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,162,563.

Specification of Letters Patent. Patented Nov. 30, 1915.

Application filed September 2, 1913. Serial No. 787,785.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to vehicle wheels and has for its general object the provision of an improved form of rim securing means which shall have certain definite advantages of lightness, cheapness, and convenience of operation.

In order to secure demountable rims about their fellies, the fellies are usually provided with spaced, laterally projecting bolts provided with clips. Ordinarily these clips serve to engage a wedge ring and draw it into the space between the rim and felly and heretofore this wedge ring has consisted of a hot-rolled steel section having its opposite sides shaped to conform to the surfaces with which it was to be used.

The objects of this invention are: the provision of a new and improved construction of wedge ring permitting the same to be constructed of sheet steel by cold rolling and without changing appreciably the thickness of any part thereof; the provision of a wedge ring having a large area of contact with the rim so as to support the same efficiently and permit the rim to be constructed of thinner and lighter metal than heretofore; the provision of a wedge ring of maximum strength for its weight; the provision of means for connecting the wedge ring to the rim so as to reduce the number of separate parts required to be handled in manipulating the rim; while further objects and advantages of the invention will become apparent as the description proceeds.

Figure 2:
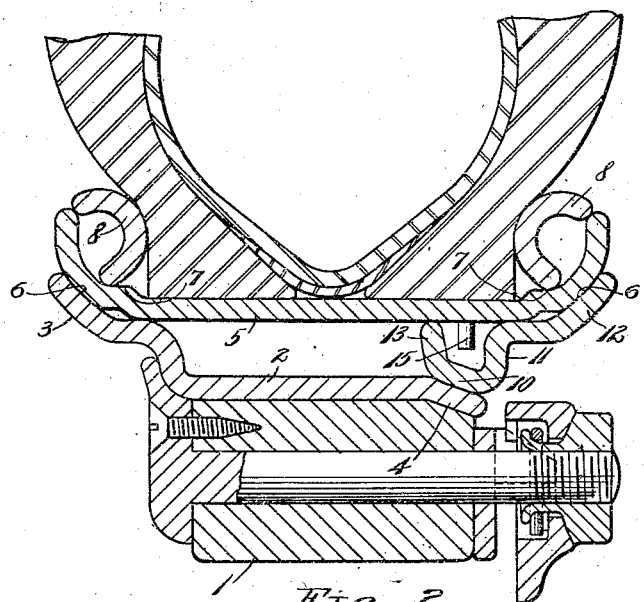

Generally speaking, my invention may be defined as consisting of the constructions and combinations illustrated in the drawings attached hereto and accompanying and forming part of this application, in which;

Figure 1 is a transverse, cross sectional view of a felly, rim and tire, showing the construction and mode of application of my wedge ring, and the line of section passing through one of the securing bolts together with its clip which is shown in operative position, and Fig. 2 is a similar view showing the same rim and felly, the clip being shown in retracted position.

The wheel as a whole comprises a circular supporting part, a rim separate therefrom and adapted to surround the same and to support a tire, and securing devices adapted to engage both supporting member and rim and hold them in fixed relation to each other. This supporting member is formed at one side with an outwardly projecting part adapted to engage and support one side of the rim, and at the other side with a portion spaced inwardly from the rim a sufficient distance to receive the wedge ring of this invention.

In the present embodiment the circular part comprises a felly 1, and felly band 2 having at one side the outwardly inclined flange 3 forming the rim engaging and supporting part and at the other side with the inwardly incline portion 4 adapted to receive the wedge ring. Other specific constructions could obviously be employed so long as the general features above described are retained. This rim member ordinarily consists essentially of an annular metallic channel member having a substantially cylindrical middle portion 5 and an outwardly flared portion 6 at each side thereof, one of these flared portions being of a size to seat upon the supporting part 3 of the supporting member and the other flared portion overhanging and spaced from the opposite side of the supporting member. In the present embodiment this rim is illustrated as of thin sheet metal having the portions 6—6 formed by cold rolling the sides of the portion 5, suitable seats 7 being also formed for the reception of cold-rolled, sheet-metal side rings 8—8. Obviously any desired type of rim can be employed with my improved wedge ring, but I have chosen the construction here illustrated as being thinner and more flexible than most and so pointing out most clearly certain advantages in the wedge ring. This wedge ring consists of a single piece of sheet metal rolled up into a ring of channel-form in cross section illustrated, and comprises an intermediate beveled portion 10 adapted to engage the complementary beveled portion 4 of the felly band, an abutment portion 11 on one side of this beveled portion for the reception of the clip, a marginal portion 12 outside of this abutment portion and adapted to engage the portion 6 of the rim, and a bracing portion 13 on the opposite of the portion 10 from said on the abutment 11 and adapted to engage the cylindrical interior 5 of the rim so as to prevent the ring from being distorted or turned inside out by the strain. The portion 12 of this ring is preferably complementary in shape to the supporting part 3 of the supporting member, and, in a case like the present where the rim is of thin metal and needs support, is extended laterally sufficiently to engage a considerable area of the rim.

The portion 5 of the rim is also preferably provided along its outer margin with internal studs 15 which may be either elongated rivet-beads or separate blocks welded or riveted to the ring. These project into the annular space defined by the portions 11 and 13 of the wedge ring so as to maintain the same in engagement with the rim even when the latter is removed from the wheel. The width of these studs is less than that of the groove so as to permit the necessary relative movement of the parts. The wedge ring is discontinuous which permits it to be removed upon occasion but has a tendency to expand which causes it to engage said studs and prevents its accidental displacement. This expedient diminishes the number of parts to be handled and facilitates the manipulation of the rim by a single operator. Also it maintains the shoulder of the ring sufficiently near the side of the felly so that no difficulty is experienced in applying the clips thereto. This is particularly important if it be desired to employ an automatic clip as illustrated in these drawings, wherein I have shown a clip of the type disclosed and claimed in my copending application filed May 6, 1912, Ser. No. 695,413, and is convenient in any case since it permits the use of a shorter bolt. However, any suitable or desired type of clip can be employed without change in the mode of operation, and many other modifications and variations can be made without departing from the scope of my invention, as will be obvious.

Having thus described my invention, what I claim is:—

1. As an article of manufacture, a wedge for securing a demountable rim on a wheel, said wedge consisting of a piece of sheet metal of channel-form in cross-section opening outwardly, an intermediate portion of said wedge being adapted for engagement with the wheel, one side thereof being abruptly shouldered and having a flaring portion for engagement with the side of the rim, and the other side of said wedge forming a bracing portion for engagement with the inner face of the rim.

2. As an article of manufacture, a wedge for securing a demountable rim on a wheel, said wedge consisting of a ring of sheet metal of channel-form in cross-section opening outwardly, an intermediate portion of said ring being adapted for engagement with the wheel, one side thereof being abruptly shouldered and having a flaring portion for engagement with the side of the rim, and the other side of said ring forming a bracing portion for engagement with the inner face of the rim.

3. As an article of manufacture, a wedge for securing a demountable rim on a wheel, said wedge consisting of a ring of sheet metal of channel-form in cross-section opening outwardly, an intermediate portion of said ring being beveled so as to be adapted for wedging engagement with the wheel, one side thereof being abruptly shouldered and having a flaring portion for engagement with the side of the rim, and the other side of said ring forming a bracing portion for engagement with the inner face of the rim.

4. In a vehicle wheel, the combination with the wheel-felly and a demountable rim therefor; of a wedge for securing said rim on said wheel, said wedge consisting of a piece of sheet metal of channel-form in cross-section opening outwardly, an intermediate portion of said wedge being adapted for engagement with the wheel, one side thereof being abruptly shouldered and having a flaring portion for engagement with the side of the rim, and the other side of said wedge forming a bracing portion for engagement with the inner face of the rim.

5. In a vehicle wheel, the combination with a wheel-felly and a demountable rim therefor; of a wedge for securing said rim on said wheel, said wedge consisting of a ring of sheet metal of channel-form in cross-section opening outwardly, an intermediate portion of said ring being adapted for engagement with the wheel, one side thereof being abruptly shouldered and having a flaring portion for engagement with the side of the rim, and the other side of said ring forming a bracing portion for engagement with the inner face of the rim.

6. In a vehicle wheel, the combination with the wheel-felly and a demountable rim therefor; of a wedge for securing said rim on said wheel, said wedge consisting of a ring of sheet metal of channel-form in cross-section opening outwardly, an intermediate portion of said ring being beveled so as to be adapted for wedging engagement with the wheel, one side thereof being abruptly shouldered and having a flaring portion for engagement with the side of the rim, and the other side of said ring forming a bracing portion for engagement with the inner face of the rim.

7. In a vehicle wheel, the combination with the wheel-felly and a demountable rim therefor, said rim being provided with an internal projection near its one edge; of a wedge for securing said rim on said wheel, said wedge consisting of a sheet-metal piece of channel-form in cross-section opening outwardly, and normally engaging the projection on said rim, an intermediate portion of said wedge being adapted for engagement with the wheel, one side thereof being abruptly shouldered and having a flaring portion for engagement with the side of the rim, and the other side of said wedge forming a bracing portion for engagement with the inner face of the rim.

8. In a vehicle wheel, the combination with the wheel-felly and a demountable rim therefor, said rim being provided with internal projections near its one edge; of a wedge for securing said rim on said wheel, said wedge consisting of a transversely split sheet-metal ring of channel-form in cross-section opening outwardly and normally engaging the projections on said rim, an intermediate portion of said ring being adapted for engagement with the wheel, one side thereof being abruptly shouldered and having a flaring portion for engagement with the side of the rim, and the other side of said ring forming a bracing portion for engagement with the inner face of the rim.

9. In a vehicle wheel, the combination with the wheel-felly and a demountable rim therefor, said rim being provided with internal projections near its one edge; of a wedge for securing said rim on said wheel, said wedge consisting of a transversely split sheet-metal ring of channel-form in cross-section opening outwardly and normally engaging the projections on said rim, an intermediate portion of said ring being beveled so as to be adapted for wedging engagement with the wheel, one side thereof being abruptly shouldered and having a flaring portion for engagement with the side of the rim, and the other side of said ring forming a bracing portion for engagement with the inner face of the rim.

In testimony whereof, I hereunto affix my signature in the presence of two witnesses.

RICHARD S. BRYANT.

Witnesses:
BRENNAN B. WEST,
HAROLD E. SMITH.